(12) United States Patent
Nashiki et al.

(10) Patent No.: US 8,481,150 B2
(45) Date of Patent: *Jul. 9, 2013

(54) TRANSPARENT CONDUCTIVE MULTILAYER BODY AND TOUCH PANEL

(75) Inventors: Tomotake Nashiki, Ibaraki (JP);
Hidetoshi Yoshitake, Ibaraki (JP);
Hideo Sugawara, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,569

(22) Filed: Nov. 7, 2011

(65) Prior Publication Data

US 2012/0052278 A1 Mar. 1, 2012

Related U.S. Application Data

(63) Continuation of application No. 11/579,142, filed as application No. PCT/JP2005/007708 on Apr. 22, 2005, now Pat. No. 8,097,330.

(30) Foreign Application Priority Data

Apr. 30, 2004 (JP) .................................. 2004-135126
Oct. 13, 2004 (JP) .................................. 2004-298905

(51) Int. Cl.
*B32B 7/04* (2006.01)
*G06F 3/041* (2006.01)

(52) U.S. Cl.
USPC ............ 428/220; 428/697; 428/702; 428/337

(58) Field of Classification Search
None
See application file for complete search history.

(56) References Cited

U.S. PATENT DOCUMENTS

| | | |
|---|---|---|
| 6,720,955 B2 | 4/2004 | Sugawara et al. |
| 2002/0158853 A1 | 10/2002 | Sugawara et al. |
| 2004/0151895 A1 | 8/2004 | Itoh et al. |
| 2005/0170158 A1 | 8/2005 | Hattori et al. |

FOREIGN PATENT DOCUMENTS

| | | |
|---|---|---|
| JP | 2-213006 A | 8/1990 |
| JP | 2-273409 A | 11/1990 |
| JP | 2525475 B2 | 8/1996 |

(Continued)

OTHER PUBLICATIONS

Chinese Office Action dated Apr. 24, 2009, issued in corresponding Chinese Patent Application No. 2005800127800.

(Continued)

*Primary Examiner* — Maria Veronica Ewald
*Assistant Examiner* — Prashant J Khatri
(74) *Attorney, Agent, or Firm* — Westerman, Hattori, Daniels & Adrian, LLP

(57) ABSTRACT

A transparent conductive multilayer body of the invention comprises a transparent film substrate with a thickness of 2 to 120 μm; a first transparent dielectric thin film, a second transparent dielectric thin film and a transparent conductive thin film laminated in this order on one side of the transparent film substrate; and a transparent substrate bonded to the other side of the film substrate through a transparent pressure-sensitive adhesive layer, wherein the second dielectric thin film is made of an inorganic material or a mixture of an organic material and an inorganic material, and the conductive thin film contains a crystalline material in which the content of crystal particles whose maximum particle sizes are at most 300 nm is higher than 50% by area. Such a transparent conductive multilayer body fully satisfies the pen input bending durability for a touch panel.

15 Claims, 2 Drawing Sheets

FOREIGN PATENT DOCUMENTS

| | | |
|---|---|---|
| JP | 10-168359 A | 6/1998 |
| JP | 11-286067 A | 10/1999 |
| JP | 2002-316378 A | 10/2002 |
| JP | 2002-326301 A | 11/2002 |
| JP | 2004-47456 A | 2/2004 |
| WO | 00-63924 A1 | 10/2000 |
| WO | 03-20509 A1 | 3/2003 |

OTHER PUBLICATIONS

Deng et al., "Development of conductive transparent indium tin oxide (ITO) thin films deposited by direct current (DC) magnetron sputtering for photon-STM applications". Appl. Phys. A 72, (2001). pp. 595-601.

Japanese Office Action issued Mar. 24, 2010 in corresponding Japanese Patent Application 2005-123849.

Koch, C.C. (edited by Buschow et al.). "Encyclopedia of Materials: Science and Technology". Elsevier, (2001). pp. 5901-5905.

Notification of Transmittal of Translation of the International Preliminary Report on Patentability (Form PCT/IB/338) of International Application No. PCT/JP2005/007708 mailed Mar. 1, 2007 with Form PCT/IPEA/409.

Shin et al. "Properties of dc magnetron sputtered indium tin oxide films on polymeric substrates at room temperature". J. Appl. Phys., vol. 89, No. 9, (2001). pp. 5199-5203.

Song et al. "Study on Crystallinity of Tin-Doped Indium Oxide Films Deposited by DC Magnetron Sputtering". Jpn. J. Appl. Phys., vol. 37, (1998) Pt. 1, No. 4A. pp. 1870-1876.

Zhang et al., "Indium tin oxide films prepared by radio frequency magnetron sputtering at a low processing temperature". Thin Solid Films, 376, (2000). pp. 255-263.

International Search Report of PCT/JP2005/007708 date of mailing Jun. 7, 2005.

Taiwanese Office Action dated Nov. 30, 2011, issued in corresponding Taiwanese Patent Application No. 094113081.

TRANSPARENT CONDUCTIVE MULTILAYER BODY AND TOUCH PANEL

CROSS-REFERENCE TO RELATED APPLICATION

This application is a continuation application of U.S. patent application Ser. No. 11/579,142 filed on Oct. 30, 2006, which is a National Stage Application of PCT/JP2005/007708 filed Apr. 22, 2005, which claims the benefit of priority from Japanese Patent Applications 2004-135126, filed Apr. 30, 2004, and 2004-298905, filed Oct. 13, 2004, the entire contents of which are incorporated herein by reference.

TECHNICAL FIELD

The present invention relates to a transparent conductive multilayer body comprising a film substrate such as a polyethylene terephthalate film and to a tough panel therewith.

BACKGROUND ART

Thin films that are transparent in the visible light range and electrically conductive are used for transparent electrodes of new display systems such as liquid crystal displays, electroluminescence displays, and touch panels, and for prevention of static charge, blockage of electromagnetic waves or the like in transparent products.

Well-known examples of such transparent conductive thin films include conductive glass materials in which an indium oxide thin film is formed on a glass. However, such materials have a glass substrate and thus have poor flexibility or workability and cannot be used in some applications.

In recent years, therefore, transparent conductive thin films formed on a substrate of various plastic films such as polyethylene terephthalate films have been used, because of advantages such as good impact resistance and lightweight as well as flexibility and workability.

The transparent conductive thin film formed on such a film substrate has a relatively high surface optical reflectance and thus has the problem of low transparency. The conductive thin film formed on such a film substrate also has low abrasion resistance or low bending resistance and thus has a problem in which it can be scratched during use to increase the electric resistance or to cause disconnection.

Particularly when used in a touch panel, a pair of conductive thin films is opposed through a spacer and can be strongly brought into contact with each other by pressing and dotting from one panel plate side. Thus, it is strongly desired that the conductive thin films have good durability to withstand that and thus have good dotting properties, particularly pen input durability. However, the conventional transparent conductive thin films as described above are inferior in such durability and have a problem in which it makes the life of touch panels short, because of such low durability.

Therefore, some attempts have been made to overcome the above problems with the transparent conductive thin films formed on the film substrate. There is proposed a transparent conductive multilayer body in which a first transparent dielectric thin film, a second transparent dielectric thin film, and a transparent conductive thin film are laminated in this order on one side of a transparent film substrate with a thickness of 2 to 120 μm, while a transparent substrate is bonded to the other side of the film substrate through a transparent pressure-sensitive adhesive layer (see Japanese Patent Application Laid-Open (JP-A) No. 2002-316378 and JP-A No. 2002-326301).

DISCLOSURE OF INVENTION

Problems to be Solved by the Invention

The above-mentioned transparent conductive multilayer body comprises a film substrate, an conductive thin film formed on one side of the film substrate, a transparent substrate bonded to the other side of the film substrate, and a first and a second dielectric thin films placed between the conductive thin film and the film substrate, wherein the light refractive indices of these thin films, the film substrate, and the conductive thin film are selected so as to have an appropriate relation, so that the transparency can be improved and that the abrasion resistance or bending resistance of the conductive thin film and the dotting properties of it for touch panels, particularly the pen input durability of it can be improved.

As a result of further investigations of the inventors, it has been found that even the above-mentioned transparent conductive multilayer body can have insufficient bending resistance in some cases. Specifically in the touch panel marketplace, recent years have seen an increase in new applications such as games and smart phones. In the design of such touch panels, the development of small frame has been pursued, and the portions around such frame can be more bent when used. Thus, high pen input bending resistance against that has been desired. Additionally, touch panels have been used under more rigorous conditions, and thus it has been desired that touch panels have high load pen input durability to withstand an input load higher than the conventional input load. However, it has been found that the above-mentioned transparent conductive multilayer body cannot fully meet such requirements in some cases.

Under the circumstances, an object of the invention is to improve the already proposed transparent conductive multilayer body and to provide a transparent conductive multilayer body that has further improved bending resistance and thus highly satisfactory dotting properties for touch panels, and particularly has highly satisfactory pen input bending durability and high load pen input durability at the same time and to provide a touch panel using such a transparent conductive multilayer body.

Means for Solving the Problems

In the course of investigations for the above object, the inventors have focused attention to the crystal particle size of the conductive thin film formed on the film substrate through the first and second dielectric thin films in the already-proposed transparent conductive multilayer body. The crystal particle size depends on the composition of the material for the conductive thin film itself, such as an increase or decrease in the tin oxide content of a tin oxide-containing indium oxide thin film, the composition of the material for the second dielectric thin film serving as a base for the conductive thin film, or the method for forming each of these thin films.

Thus, a large number of transparent conductive multilayer bodies different in the crystal particle size of the conductive thin film have been prepared, and careful experiments and examinations have been performed on their performance. As a result, it has been found that there is a close relationship between the crystal particle size, the particle size distribution and the bending resistance of the conductive thin film and that if the content of crystal particles having specific particle sizes is controlled to be in a specific range, the bending resistance can be improved, and the dotting properties for touch panels, particularly pen input bending durability can be significantly improved as well as pen input durability.

That, the present invention is related to a transparent conductive multilayer body, comprises:

a transparent film substrate with a thickness of 2 to 120 μm;

a first transparent dielectric thin film, a second transparent dielectric thin film and a transparent conductive thin film laminated in this order on one side of the transparent film substrate; and a transparent substrate bonded to the other side of the film substrate through a transparent pressure-sensitive adhesive layer, wherein the second dielectric thin film is made of an inorganic material or a mixture of an organic material and an inorganic material, and the conductive thin film contains a crystalline material in which the content of crystal particles whose maximum particle sizes are at most 300 nm is higher than 50% by area.

In the transparent conductive multilayer body, the transparent conductive thin film preferably contains a crystalline material in which the content of crystal particles whose maximum particle sizes are at most 200 nm is higher than 50% by area.

In the transparent conductive multilayer body, the transparent conductive thin film preferably has a hardness of at least 1.5 GPa and an elastic modulus of at least 6 GPa.

In the transparent conductive multilayer body, the conductive thin film can be made of an indium oxide material containing tin oxide, and the content of the tin oxide in the total of the indium oxide and the tin oxide is preferably from 2 to 50% by weight. Further, the content of the tin oxide in the total of the indium oxide and the tin oxide is preferably from 3 to 15% by weight.

In the transparent conductive multilayer body, the light refractive index $n_1$ of the film substrate, the light refractive index $n_2$ of the first dielectric thin film, the light refractive index $n_3$ of the second dielectric thin film, and the light refractive index $n_4$ of the conductive thin film preferably satisfy the relation: $n_3 < n_2 \leq n_1 < n_4$, the first dielectric thin film preferably has a thickness of 100 to 250 nm, and the second dielectric thin film preferably has a thickness of 15 to 100 nm.

In the transparent conductive multilayer body, the first dielectric thin film can be made of an organic material or a mixture of an organic material and an inorganic material.

In the transparent conductive multilayer body, the second dielectric thin film is preferably an inorganic material formed by a vacuum deposition method.

The present invention is also related to a touch panel, comprising:

a pair of panel plates each having an conductive thin film; and a spacer placed between the panel plates, wherein the panel plates are placed opposite each other through the spacer in such a manner that the conductive thin films are placed opposite each other, and at least one of the panel plates comprises the transparent conductive multilayer body according to any one of claims 1 to 8.

Effects of the Invention

In the transparent conductive multilayer body of the invention having the conductive thin film formed on one side of the film substrate through the first and second dielectric thin films, the second dielectric thin film is made of an inorganic material or a mixture of an organic material and an inorganic material, and the conductive thin film contains a crystalline material in which the content of crystal particles having specific particle sizes is controlled to be within a specific range, so that the durability of the conductive thin film can be further improved due to a further improvement in the abrasion resistance and the bending resistance of the conductive thin film and that highly satisfactory dotting properties for touch panels, particularly, highly satisfactory pen input durability and pen input bending durability can be achieved. In the transparent conductive multilayer body of the invention, the thicknesses or refractive indices of the respective thin films may be selected such that they have an appropriate relationship, so that the properties such as transparency can be satisfactory.

BEST MODE FOR CARRYING OUT THE INVENTION

Figure 1:
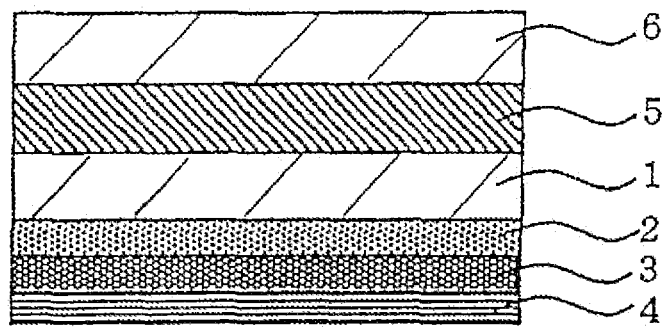
FIG. 1 is a cross-sectional view showing an example of the transparent conductive multilayer body of the invention.

Any appropriate material may be used for the film substrate in the invention. Examples thereof include polyester resins, acetate resins, polyethersulfone resins, polycarbonate resins, polyamide resins, polyimide resins, polyolefin resins, acrylic resins, polyvinyl chloride resins, polystyrene resins, polyvinyl alcohol resins, polyarylate resins, polyphenylenesulfide resins, polyvinylidene chloride resins, and (meth)acrylic resins. In particular, polyester resins, polycarbonate resins, polyolefin resins, or the like are preferred.

The thickness of the film substrate is essentially from 2 to 120 μm, particularly preferably from 6 to 100 μm. If the film substrate has a thickness of less than 2 μm, a mechanical strength of the film substrate can be insufficient, and it can be difficult to handle the substrate in the form of a roll for continuous production of the thin films such as the dielectric thin film and the conductive thin film or for continuous production of the pressure-sensitive adhesive layer. If the film substrate has a thickness of more than 120 μm, the abrasion resistance of the conductive thin film or the dotting properties of it for touch panels cannot be improved based on the cushion effect of the pressure-sensitive adhesive layer as described later.

Etching processing, such as sputtering, corona discharging, flame processing, ultraviolet rays irradiation, electron ray irradiation, chemical conversion coating, oxidation, etc., undercoat processing may be performed to the surface of the film substrate beforehand in order to improve adhesion to the film substrate of the first dielectric thin film that is to be prepared thereon. Moreover, before forming the first dielectric thin film, dust removing and cleaning processing may be performed by solvent cleaning, ultrasonic cleaning etc., if needed.

According to the invention, the first transparent dielectric thin film and the second transparent dielectric thin film are laminated as bases for the transparent conductive thin film in this order on one side of the film substrate configured as described above. The second dielectric thin film is made of an inorganic material or a mixture of an inorganic material and an organic material. The lamination of the base thin films provides improvements in transparency and in the abrasion resistance or bending resistance of the conductive film and provides good results for improvement of dotting properties for touch panels.

As material of the first and second transparent dielectric thin film, for example, inorganic materials [numerical values in ( ) of each material represents a light refractive index], such as; NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), CeF (1.63), $Al_2O_3$ (1.63); and organic materials having about 1.4 to 1.6 of the light refractive index, such as acrylic resins, urethane resins, siloxane polymers, alkyd resins, and melamine resins, or a mixture of the organic material and the inorganic material may be mentioned.

Among the above materials, the material for the first dielectric thin film is preferably the organic material or a mixture of the organic material and the inorganic material. In particular, the organic material is preferably a thermosetting resin composed of a mixture of a melamine resin, an alkyd resin and an organic silane condensate.

The material for the second dielectric thin film is the inorganic material or a mixture of the organic material and the inorganic material. In particular, the inorganic material is preferably $SiO_2$, $MgF_2$, $Al_2O_3$, or the like.

Using any of the above materials, the first dielectric thin film and the second dielectric thin film may be formed by a vacuum deposition method, a sputtering method, an ion plating method, a coating method, or the like. In particular, the second dielectric thin film is preferably formed by a vacuum deposition method. If the transparent conductive thin film is formed on the second dielectric thin film formed by the vacuum deposition method, the distribution of the sizes of crystal particles that form the transparent conductive thin film can be easily controlled to be in the above preferred range. In the vacuum deposition method, the film-forming material may be heated by a beam heating method or a resistance heating method.

The first dielectric thin film may have a thickness of 100 to 250 nm, preferably of 130 to 200 nm. The second dielectric thin film may have a thickness of 15 to 100 nm, preferably of 20 to 60 nm. The thickness of each of the first and second dielectric thin films in the above range can facilitate simultaneous achievement of different properties including transparency, abrasion resistance and bending resistance.

According to the invention, the first and second dielectric thin films are laminated as base thin films on one side of the film substrate, and then the transparent conductive thin film is formed thereon. The conductive thin film may be formed by the same method as for the production of the first or second dielectric thin film. For example, the material for the thin film is preferably, but not limited to, an indium oxide material containing tin oxide or a tin oxide material containing antimony. The indium oxide material containing tin oxide is particularly preferred.

The conductive thin film generally has a thickness of at least 10 nm, preferably of 10 to 300 nm. If the thickness is less than 10 nm, it can be difficult to form a continuous film with good electrical conductivity characterized by a surface electric resistance of at most $10^3$ Ω/square. Too thick conductive films can tend to reduce the transparency.

According to the invention, the conductive thin film formed as described above is made of a crystalline material in which the content of crystal particles whose maximum particle sizes are at most 300 nm is controlled to be higher than 50% by area. The maximum crystal particle size and distribution may be determined by observing the surface of the conductive thin film with a field emission transmission electron microscope (FE-TEM). The maximum crystal particle size corresponds to the maximum diagonal length or the maximum diameter of the observed polygonal or elliptical shape in each domain. The content of the crystal particles with maximum particle sizes in the above range is specifically the ratio of the area occupied by the corresponding crystal particles to a unit area (1.5 μm×1.5 μm) in the electron microscope image as described above.

The conductive thin film is preferably made of a crystalline material in which the content of crystal particles whose maximum particle sizes are at most 200 nm is higher than 50% by area. The content of crystal particles whose maximum particle sizes are at most 100 nm is more preferably higher than 50% by area, still more preferably at least 70% by area, yet more preferably at least 80% by area. It has been found that such control of the crystal in the conductive thin film allows a further improvement in bending resistance, suppression of cracking or the like during bending, and a significant improvement in pen input bending durability for touch panels. If the crystal particle sizes of the conductive thin film are too small, amorphous-like portions can exist in the conductive thin film to reduce the reliability or the pen input durability. Thus, it is preferred that the crystal particle sizes be not too small. From this point of view, the maximum crystal particle sizes are preferably at least 10 nm, more preferably at least 30 nm.

In a preferred mode, the material forming the conductive thin film does not contain crystal particles with maximum particle sizes of more than 300 nm. For example, the maximum particle sizes of the crystalline material forming the conductive thin film may be classified into the following distribution range groups: at most 100 nm, above 100 to 200 nm, and above 200 to 300 nm. In this case, it is preferred, in terms of durability balance, which the crystal particle sizes should not fall into one of the distribution range groups but should fall into at least two of the distribution range groups. The content of the crystal particles belonging to each of the at least two of the distribution range groups is preferably at least 5% by area. In particular, the content of the crystal particles belonging to each of the distribution range group of at most 100 nm and the distribution range group of above 100 to 200 nm is preferably at least 5% by area. Most preferably, the content of the crystal particles belonging to the distribution range group of at most 100 nm is higher than 50% by area, more preferably at least 70% by area, further preferably at least 80% by area, and the remaining crystal particles preferably fall into the distribution range group of above 100 to 200 nm. The average of the maximum particle sizes of the crystalline material forming the conductive thin film is preferably from 50 to 250 nm, more preferably from 60 to 150 nm, still more preferably from 70 to 100 nm.

The composition of the material for the conductive thin film or the method for forming the thin film may be appropriately selected in order to control the crystal particle size and particle size distribution of the conductive thin film as described above. For example, in a case where the conductive thin film is made of an indium oxide material containing tin oxide (ITO), the content of relatively small crystal particles can be increased by increasing the content of tin oxide in ITO. The tin oxide content of ITO (the content of tin oxide in the total of indium oxide and tin oxide) is preferably from 2 to 50% by weight, more preferably from 3 to 15% by weight, particularly preferably from 3 to 10% by weight.

The crystal particle size and particle size distribution of the conductive thin film can also be controlled by selecting the composition of the material for the first or second dielectric thin film serving as a base for the conductive thin film or by selecting the method for forming it. For example, in a case where a $SiO_2$ thin film is formed as the second dielectric thin film, the content of relatively small crystal particles in the conductive thin film can be made higher by a vacuum deposition method using electron beam heating than by a silica coating method.

In the invention, the light refractive index of the film substrate is generally from about 1.4 to about 1.7, while the light refractive index of the conductive thin film is generally about 2. The light refractive index $n_1$ of the film substrate, the light refractive index $n_2$ of the first dielectric thin film, the light refractive index $n_3$ of the second dielectric thin film, and the light refractive index $n_4$ of the conductive thin film preferably satisfy the relation: $n_3 < n_2 < n_1 < n_4$. In a preferred mode, appropriate materials are selected from the above materials such that the first and second dielectric thin films satisfy the above relation between the light refractive indices, namely such that the light refractive index $n_2$ of the first dielectric thin film is higher than the light refractive index $n_3$ of the second dielectric thin film and equal to or lower than the light refractive index $n_1$ of the film substrate.

In the invention, the transparent substrate is bonded by the transparent pressure-sensitive adhesive layer to the other side of the film substrate on which the transparent conductive thin film is formed through the first and second transparent dielectric thin film. The bonding of the transparent substrate may be performed by a process including the steps of forming the pressure-sensitive adhesive layer on the transparent substrate and bonding the film substrate thereto or by a process including the steps of forming the pressure-sensitive adhesive layer contrarily on the film substrate and bonding the transparent substrate thereto. The latter process is more advantageous in terms of productivity, because it enables continuous production of the pressure-sensitive adhesive layer with the film substrate in the form of a roll.

As a pressure sensitive adhesive layer, which has transparency, is used, for example, acrylics pressure sensitive adhesives, silicone pressure sensitive adhesives, rubber pressure sensitive adhesives, etc. may be mentioned. This pressure sensitive adhesive layer has a function improving abrasion resistance and dotting properties as touch panels of the transparent conductive thin film that is prepared on one face of the film substrate by cushioning effect after the transparent substrate is adhered. In order to obtain better demonstration of this function, an elastic modulus is preferably set in a range of from 1 to 100 N/cm$^2$, and a thickness is set not less than 1 μm, and usually in a range of from 5 to 100 μm.

A pressure-sensitive adhesive layer with an elastic modulus of less than 1 N/cm$^2$ can be inelastic and thus can be easily deformed by pressing to cause the film substrate and then the conductive thin film to have irregularities or can easily cause a protrusion of the pressure-sensitive adhesive from the processed or cut surface, and can reduce the effect of improving the abrasion resistance of the conductive thin film or the dotting properties of it for touch panels. A pressure-sensitive adhesive layer with an elastic modulus of more than 100 N/cm$^2$ can be so hard that the cushion effect cannot be expected so that it can be impossible to improve the abrasion resistance of the conductive thin film or the dotting properties of it for touch panels.

If the thickness of the pressure-sensitive adhesive layer is less than 1 μm, its cushion effect cannot be expected so that an improvement in the abrasion resistance of the conductive thin film or in the dotting properties of it for touch panels cannot be expected. Too thick pressure-sensitive adhesive layers can lose transparency or can hardly produce good results for the production of the pressure-sensitive adhesive layer, the workability of bonding the transparent substrate, or cost performance.

The transparent substrate bonded by the pressure sensitive adhesive layer gives a good mechanical strength to the film substrate, and especially it contributes to prevention of curling etc. When it is required that it should have a flexibility after adhered, a plastic film with a thickness about 6 to 300 μm is usually used, and when especially a flexibility is not required, a glass plate and plastics in a shape of a film and a plate with thickness of approximately 0.05 to 10 mm are usually used. As material of plastics, the same material as the above mentioned film substrate may be mentioned.

Moreover, if needed, an antiglare processed layer and an antireflection processed layer aiming at improvement in visibility may be prepared or a hard coat processed layer aiming at protection of an outer face may be formed on an outer face, which is a face opposite to a pressure sensitive adhesive layer side, of the above transparent substrate. As hard coat processed layer, curable coat comprising curable type resins, such as melanin resins, urethane resins, alkyd resins, acrylics resins, and silicon resins, may be used preferably.

As described above, in the transparent conductive multilayer body of the invention, the transparent conductive thin film having specific crystal particle sizes and a specific particle size distribution is laminated on one side of the transparent film substrate through the first and second transparent dielectric thin films, while the transparent substrate is bonded to the other side of the film substrate through the transparent pressure-sensitive adhesive layer.

With respect to the physical properties of the conductive thin film side of the transparent conductive multilayer body, the hardness of the conductive thin film side is preferably at least 1 GPa, particularly preferably 1.5 GPa, and the elastic modulus of the conductive thin film side is preferably at least 5 GPa, particularly preferably at least 6 GPa. The transparent conductive multilayer body having such physical properties can be prevented from suffering cracks in the conductive thin film or causing a problem such as degradation in electric resistance, even if it is bent, so that it can offer high bending resistance performance and can be suitably used for a substrate in the field of optoelectronics such as touch panels. In terms of crack resistance, the hardness of the conductive thin film side preferably has an upper limit of at most 5 GPa, more preferably of at most 4 GPa. Also in terms of crack resistance, the elastic modulus of the conductive thin film side preferably has an upper limit of at most 20 GPa, more preferably of at most 16 GPa.

For example, the hardness and the elastic modulus of the conductive thin film side may be measured with a scanning probe microscope (such as JSPM-4200, JEOL. Ltd.) or the like by an indentation test (indenter indentation test). In the measurement of the hardness of thin films, the indenter indentation depth should be at most about one-tenth of the film thickness.

In the indentation test, an indenter is pressed into a test subject (namely the conductive thin film side of the transparent conductive multilayer body) with a load applied thereto, while an indentation curve is obtained (a load-indentation depth curve). The hardness H of the test subject may be calculated from the maximum load Pmax and the contact project area A between the indenter and the test sample in the test, according to Formula (1) below. The composite elastic modulus Er of the test subject may be calculated from the initial slope S of the unloading curve of the indentation curve according to Formula (2) below. The Young's modulus Es of the test subject may be calculated from the Young's modulus Ei of the indenter, the Poisson's ratio vi of the indenter, and the Poisson's ratio vs of the test subject, according to Formula (3) below.

In below Formula (2), β is a constant. The indenter is made of diamond, which has a Young's modulus Ei of 1,140 GPa and a Poisson's ratio of 0.07.

$$H = P\max/A \quad (1)$$

$$S = (2/\sqrt{\pi}) \cdot Er\beta\sqrt{A} \quad (2)$$

$$Er = 1/\{(1-vs2)/Es + (1-vi2)/Ei\} \quad (3)$$

Since the Poisson's ratio vs of the conductive thin film (the test subject) are unknown, the composite elastic modulus Er may be defined as the elastic modulus according to the invention. Specifically, the measurement may be performed by known methods, for example, described in W. C. Oliver and G. M. Phar, J. Meter. Res., Vol. 7, No. 6, June 1992 and Handbook of Micro/Nanotribology.

FIG. 1 shows an example of the transparent conductive multilayer body of the invention, in which a first transparent dielectric thin film 2, a second transparent dielectric thin film 3, and a transparent conductive thin film 4 are laminated in this order on one side of a transparent film substrate 1, while a transparent substrate 6 is bonded to the other side through a pressure-sensitive adhesive layer 5.

Figure 2:
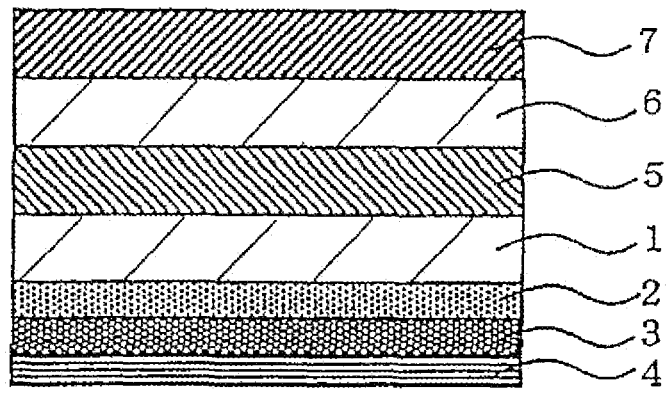
FIG. 2 is a cross-sectional view showing another example of the transparent conductive multilayer body of the invention.

FIG. 2 shows another example of the transparent conductive multilayer body, in which a hard coat layer 7 is formed on the outer surface of the transparent substrate 6. The other elements, which are the same as in FIG. 1, are represented by the same reference numerals, and their description is omitted here.

Figure 3:
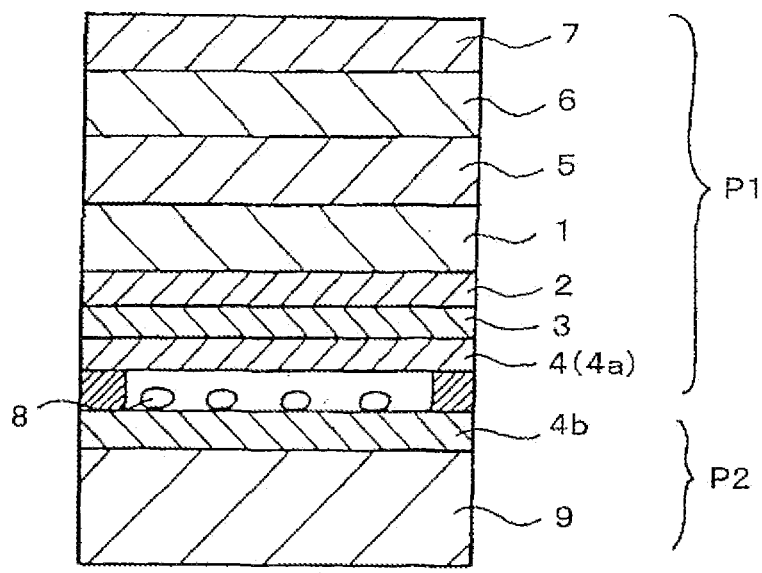
FIG. 3 is a cross-sectional view showing a touch panel using the transparent conductive multilayer body of the invention.

FIG. 3 shows an example of a touch panel using a transparent conductive multilayer body of the present invention. In a touch panel, a pair of panel plates P1 and P2 having transparent conductive thin films 4a and 4b are opposed to each other through a spacer 8 in such a manner that the transparent conductive thin films 4a and 4b currently formed mutually orthogonal face countered to each other, the transparent conductive multilayer body shown in above described FIG. 2 is used as one panel plate P1.

This touch panel serves as a transparent switching body structure having a function in which a pressure applied from the panel plate P1 side with an input pen the conductive thin films 4a and 4b contact each other to put an electrical circuit in a state of ON, and if the above described pressure applied is canceled, the electrical circuit is made to return to an original OFF state. In this case, since the panel plate P1 is made from the above described transparent conductive multilayer body, it has an outstanding abrasion resistance and outstanding dotting properties as a conductive thin film, and thus the above described function can be stably maintained over a long period of time.

In addition, in FIG. 3, the panel plate P1 may be a transparent conductive multilayer body shown in FIG. 1. Moreover, in the panel plate P2, the conductive thin film 4b is prepared on the transparent substrate comprising plastic film or a glass plate, etc., and the same transparent conductive multilayer body as the above described panel plate P1 shown in FIG. 1 or FIG. 2 may be used.

EXAMPLES

The invention is more specifically described below by showing some examples in comparison with some comparative examples. Hereinafter, the term "part" or "parts" means part or parts by weight.

The crystal particle size and the particle size distribution of the conductive thin film were evaluated by observing the surface of the conductive thin film with a field emission transmission electron microscope (FE-TEM, Hitachi, and HF-2000). Specifically, the maximum crystal particle size was measured by the following method: An ITO film was first formed on a polyester film by sputtering; The film was then placed in a Petri dish, into which hexafluoroisopropanol was gently poured so that the polyester film was dissolved and removed; The ITO thin film was then taken up with a platinum mesh and fixed on the sample stage of the transmission electron microscope; The sample was photographed at a magnification of 50,000 to 200,000 appropriate to each example, and the maximum particle sizes of the crystal particles existing in a 1.5 μm×1.5 μm unit area were observed and evaluated.

Example 1

One side of a transparent film substrate (with a light refractive index $n_1$ of 1.66) made of a 25 μm-thick polyethylene terephthalate film (hereinafter referred to as "PET film") was coated with a 150 nm-thick cured film (with a light refractive index $n_2$ of 1.54) of a thermosetting resin composed of a melamine resin, an alkyd resin and an organic silane condensate (2:2:1 in weight ratio), which was formed as a first transparent dielectric thin film.

A $SiO_2$ thin film was then formed as a second dielectric thin film on the first dielectric thin film by a silica coating method. Specifically, a silica sol (Colcoat P manufactured by Colcoat Co., Ltd.) was diluted with ethanol so as to have a solids content of 2%, and the diluted silica sol was applied to the first dielectric thin film, dried at 150° C. for two minutes and then cured to form a 30 nm-thick $SiO_2$ thin film (with a light refractive index $n_3$ of 1.46) as the second transparent dielectric thin film.

After the thin base films were laminated on the film substrate as described above, a transparent conductive thin film of a 20 nm-thick complex oxide (with a light refractive index $n_4$ of 2.00) of indium oxide and tin oxide (a thin ITO film) was formed thereon (on the second dielectric thin film) by a sputtering method using a sintered material of a mixture of 97% by weight of indium oxide and 3% by weight of tin oxide in a $4 \times 10^{-3}$ Pa atmosphere composed of argon gas 80% and oxygen gas 20%, and then heated at 150° C. for 1.5 hours. The crystal particle size distribution of the conductive thin film is shown in Table 2.

An about 20 μm-thick transparent acrylic pressure-sensitive adhesive layer with an adjusted elastic modulus of 10 N/cm² was then formed on the other side of the PET film. The acrylic pressure-sensitive adhesive was a mixture of one part of an isocyanate crosslinking agent and 100 parts of a copolymer of a monomer mixture of butyl acrylate, acrylic acid and vinyl acetate in weight ratio of 100:2:5. A transparent substrate made of a 125 μm-thick PET film was further bonded to the pressure-sensitive adhesive layer.

Five parts of a photopolymerization initiator of hydroxycyclohexyl phenyl ketone (Irgacure 184 manufactured by Ciba Specialty Chemicals Inc.) was added to 100 parts of an acrylic-urethane resin (Unidick 17-806 (trade name) manufactured by Dainippon Ink and Chemicals, Incorporated), and the mixture was diluted with toluene to form a toluene solution at a concentration of 50% by weight. The toluene solution was applied to the transparent substrate, dried at 100° C. for three minutes, and then immediately irradiated with ultraviolet light from two ozone-type high-pressure mercury lamps (80 W/cm, 15 cm converging type) to form a 5 μm-thick hard-coat layer so that a transparent conductive multilayer body having the structure shown in FIG. 2 was prepared.

The transparent conductive multilayer body was used as a panel plate. A 30 nm-thick ITO thin film was formed on a glass plate by the same method, and the resulting laminate was used as another panel plate. A touch panel forming a switch structure was prepared by placing these panel plates opposite each other with a gap of 150 μm provided between them through a 20 μm-thick spacer in such a manner that the ITO thin films faced each other. The ITO thin films of these panel plates had already formed such that they would be orthogonal to each other if the panel plates are placed opposite each other as described above.

Example 2

A transparent conductive multilayer body and a touch panel using it were prepared using the process of Example 1, except that the thickness of the first dielectric thin film (the cured film) was changed to 200 nm. The crystal particle size distribution of the conductive thin film is also shown in Table 2.

Example 3

A transparent conductive multilayer body and a touch panel using it were prepared using the process of Example 1, except that the thickness of the second dielectric thin film ($SiO_2$ thin film) was changed to 60 nm. The crystal particle size distribution of the conductive thin film is also shown in Table 2.

Example 4

A transparent conductive multilayer body and a touch panel using it were prepared using the process of Example 1, except that in the process of forming the second dielectric thin film ($SiO_2$ thin film), $SiO_2$ was vapor-deposited at a degree of vacuum of $1 \times 10^{-2}$ to $3 \times 10^{-2}$ Pa by electron-beam heating instead of by the silica coating method to form a 30 nm-thick $SiO_2$ thin film. The crystal particle size distribution of the conductive thin film is also shown in Table 2.

Example 5

A transparent conductive multilayer body and a touch panel using it were prepared using the process of Example 1, except that in the process of forming the conductive thin film (ITO thin film), a 20 nm-thick ITO thin film was formed using a sintered material of a mixture of 90% by weight of indium oxide and 10% by weight of tin oxide as the vapor deposition material. The crystal particle size distribution of the conductive thin film is also shown in Table 2.

Example 6

A transparent conductive multilayer body and a touch panel using it were prepared using the process of Example 1, except that in the process of forming the second dielectric thin film ($SiO_2$ thin film), $SiO_2$ was vapor-deposited at a degree of vacuum of $1 \times 10^{-2}$ to $3 \times 10^{-2}$ Pa by electron-beam heating instead of by the silica coating method to form a 30 nm-thick $SiO_2$ thin film and that in the process of forming the conductive thin film (ITO thin film), a 20 nm-thick ITO thin film was formed using a sintered material of a mixture of 90% by weight of indium oxide and 10% by weight of tin oxide as the vapor deposition material. The crystal particle size distribution of the conductive thin film is also shown in Table 2.

Example 7

A transparent conductive multilayer body and a touch panel using it were prepared using the process of Example 1, except that in the process of forming the second dielectric thin film ($SiO_2$ thin film), $SiO_2$ was vapor-deposited at a degree of vacuum of $1 \times 10^{-2}$ to $3 \times 10^{-2}$ Pa by electron-beam heating instead of by the silica coating method to form a 30 nm-thick $SiO_2$ thin film and that in the process of forming the conductive thin film (ITO thin film), a 20 nm-thick ITO thin film was formed using a sintered material of a mixture of 95% by weight of indium oxide and 5% by weight of tin oxide as the vapor deposition material. The crystal particle size distribution of the conductive thin film is also shown in Table 2.

Comparative Example 1

A transparent conductive multilayer body and a touch panel using it were prepared using the process of Example 1, except that the first dielectric thin film (the cured thin film) was not formed. The crystal particle size distribution of the conductive thin film is also shown in Table 2.

Comparative Example 2

A transparent conductive multilayer body and a touch panel using it were prepared using the process of Example 1, except that the second dielectric thin film ($SiO_2$ thin film) was not formed. The crystal particle size distribution of the conductive thin film is also shown in Table 2.

Comparative Example 3

A transparent conductive multilayer body and a touch panel using it were prepared using the process of Example 1, except that in the process of forming the conductive thin film (ITO thin film), a 20 nm-thick ITO thin film was formed using a sintered material of a mixture of 99% by weight of indium oxide and 1% by weight of tin oxide as the vapor deposition material. The crystal particle size distribution of the conductive thin film is also shown in Table 2.

Comparative Example 4

A transparent conductive multilayer body and a touch panel using it were prepared using the process of Example 5, except that the second dielectric thin film (the cured thin film) was not formed. The crystal particle size distribution of the conductive thin film is also shown in Table 2.

Comparative Example 5

A transparent conductive multilayer body and a touch panel using it were prepared using the process of Example 1, except that in the process of forming the second dielectric thin film ($SiO_2$ thin film), $SiO_2$ was vapor-deposited at a degree of vacuum of $1 \times 10^{-2}$ to $3 \times 10^{-2}$ Pa by electron-beam heating instead of by the silica coating method to form a 30 nm-thick $SiO_2$ thin film and that in the process of forming the conductive thin film (ITO thin film), a 20 nm-thick ITO thin film was formed using a sintered material of a mixture of 99% by weight of indium oxide and 1% by weight of tin oxide as the vapor deposition material. The crystal particle size distribution of the conductive thin film is also shown in Table 2.

Table 1 shows the characteristics of the transparent conductive multilayer body in each of Examples 1 to 7 and Comparative Examples 1 to 5, such as the material, refractive index, and thickness of each layer (thin film). Table 2 shows the crystal particle size distribution of each conductive thin film.

TABLE 1

| | Thickness of Transparent Substrate (μm) | Film Substrate Thickness (μm) | Film Substrate Refractive Index (n1) | First Dielectric Thin Film Material | First Dielectric Thin Film Refractive Index (n2) | First Dielectric Thin Film Thickness (nm) | Second Dielectric Thin Film Material | Second Dielectric Thin Film Forming Method | Second Dielectric Thin Film Refractive Index (n3) | Second Dielectric Thin Film Thickness (nm) | Conductive Thin Film Material | Conductive Thin Film Refractive Index (n4) | Conductive Thin Film Thickness (nm) |
|---|---|---|---|---|---|---|---|---|---|---|---|---|---|
| Example 1 | 125 | 25 | 1.66 | Resin | 1.54 | 150 | $SiO_2$ | Silica Coating | 1.46 | 30 | In/Sn (97/3) | 2.00 | 20 |
| Example 2 | 125 | 25 | 1.66 | Resin | 1.54 | 200 | $SiO_2$ | Silica Coating | 1.46 | 30 | In/Sn (97/3) | 2.00 | 20 |
| Example 3 | 125 | 25 | 1.66 | Resin | 1.54 | 150 | $SiO_2$ | Silica Coating | 1.46 | 60 | In/Sn (97/3) | 2.00 | 20 |
| Example 4 | 125 | 25 | 1.66 | Resin | 1.54 | 150 | $SiO_2$ | Vapor Deposition | 1.46 | 30 | In/Sn (97/3) | 2.00 | 20 |
| Example 5 | 125 | 25 | 1.66 | Resin | 1.54 | 150 | $SiO_2$ | Silica Coating | 1.46 | 30 | In/Sn (97/10) | 2.00 | 20 |
| Example 6 | 125 | 25 | 1.66 | Resin | 1.54 | 150 | $SiO_2$ | Vapor Deposition | 1.46 | 30 | In/Sn (97/10) | 2.00 | 20 |
| Example 7 | 125 | 25 | 1.66 | Resin | 1.54 | 150 | $SiO_2$ | Vapor Deposition | 1.46 | 30 | In/Sn (95/5) | 2.00 | 20 |
| Comparative Example 1 | 125 | 25 | 1.66 | — | — | — | $SiO_2$ | Silica Coating | 1.46 | 30 | In/Sn (97/3) | 2.00 | 20 |
| Comparave Example 2 | 125 | 25 | 1.66 | Resin | 1.54 | 150 | — | — | — | — | In/Sn (97/3) | 2.00 | 20 |
| Comparative Example 3 | 125 | 25 | 1.66 | Resin | 1.54 | 150 | $SiO_2$ | Silica Coating | 1.46 | 30 | In/Sn (99/1) | 2.00 | 20 |
| Comparative Example 4 | 125 | 25 | 1.66 | Resin | 1.54 | 150 | — | — | — | — | In/Sn (90/10) | 2.00 | 20 |
| Comparative Example 5 | 125 | 25 | 1.66 | Resin | 1.54 | 150 | $SiO_2$ | Vapor Deposition | 1.46 | 30 | In/Sn (99/1) | 2.00 | 20 |

TABLE 2

| | Distribution of Crystal Particle Sizes of Conductive Thin Film (% by area) | | | | Average Crystal Particle Size of Conductive Thin Film (nm) |
|---|---|---|---|---|---|
| | 30 to 100 nm | Above 100 to 200 nm | Above 200 to 300 nm | Above 300 nm | |
| Example 1 | 10 | 70 | 20 | 0 | 200 |
| Example 2 | 10 | 70 | 20 | 0 | 200 |
| Example 3 | 10 | 70 | 20 | 0 | 200 |
| Example 4 | 70 | 30 | 0 | 0 | 150 |
| Example 5 | 10 | 70 | 20 | 0 | 200 |
| Example 6 | 90 | 10 | 0 | 0 | 70 |
| Example 7 | 90 | 10 | 0 | 0 | 100 |
| Comparative Example 1 | 0 | 5 | 40 | 55 | 350 |
| Comparative Example 2 | 0 | 10 | 20 | 70 | 400 |
| Comparative Example 3 | 0 | 10 | 20 | 70 | 400 |
| Comparative Example 4 | 20 | 70 | 10 | 0 | 150 |
| Comparative Example 5 | 0 | 10 | 20 | 70 | 350 |

With respect to each transparent conductive multilayer body, the film resistance and the light transmittance and the hardness and elastic modulus of the conductive thin film side were measured by the methods below. The results are shown in Table 3.

Figure 4:
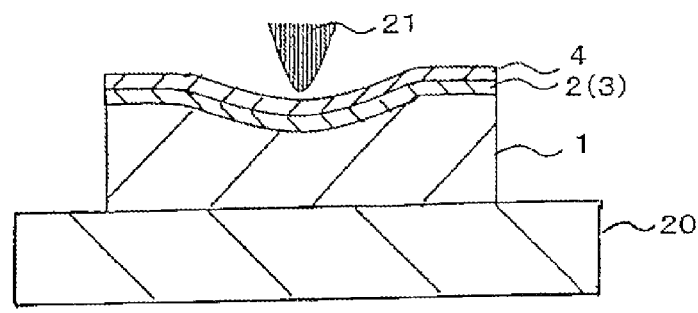
FIG. 4 is a diagram schematically showing the measurement of the hardness and the elastic modulus of the transparent conductive thin film side.

In the measurement of the hardness and the elastic modulus, the test subject used was a laminate with neither the pressure-sensitive adhesive layer nor the transparent substrate on the rear side of the film substrate (PET film), specifically a laminate as shown in FIG. 4, in which the conductive thin film (ITO thin film) 4 is formed on one side of the film substrate 1 through the base thin film (the first dielectric thin film 2 and/or the second dielectric thin film 3).

<Film Resistance>

The electric resistance (a/square) of the film surface was measured by a four-terminal method.

<Light Transmittance>

Visible light transmittance at a light wavelength of 550 nm was measured using Spectroscopic Analyzer UV-240 manufactured by Shimadzu Corporation.

<Hardness and Elastic Modulus of Conductive Thin Film Side>

The hardness and elastic modulus of the conductive thin film side were measured by the method of the indentation test as described above. Specifically, as shown in FIG. 4, the test subject was fixed on a sample stage 20 such that the conductive thin film (ITO thin film) 4 was placed on the upper side. In this fixed state, an indenter 21 was pressed into the conductive thin film 4 side under a load applied in the vertical direction, while an indentation curve (a load-indentation depth curve) was obtained. From the result, the hardness and elastic modulus of the conductive thin film side were calculated according to Formulae (1) and (2) above.

The measurement was performed using a scanning probe microscope (JSPM-4200, JEOL. Ltd.). The indenter 21 used was a diamond indenter (a triangular pyramid type, TI-037, 90°). This indenter was used to apply a load of 20 μN in the vertical direction for three seconds per one indent (an indentation of the indenter). The measurement was performed five times per one sample, and the average was calculated. A sufficient distance was kept between the measured portions such that the indentation trace would not affect each of the measurements.

With respect to the touch panel in each of the Examples 1 to 7 and Comparative Examples 1 to 5, dotting properties, pen input durability, and pen input bending durability were measured by the methods below. The results are as shown in Table 3.

<Dotting Properties>

The center point of the panel plate side formed of the transparent conductive multilayer body was hit with a urethane rubber rod (rod point 7R) with a hardness of 40 degrees a million times under a load of 100 g, and then the film resistance (Rd) was measured. The rate (Rd/Ro) of change from the initial film resistance (Ro) to Rd was calculated for the evaluation of the dotting properties. In the measurement of the film resistance, the contact resistance between the conductive thin films placed opposite each other was measured during dotting, and the film resistance was represented by the average of the measured contact resistances.

<High Load Pen Input Durability>

(A) Sliding of a polyacetal pen (pen point R 0.8 mm) on the panel plate side formed of the transparent conductive multilayer body was performed 300,000 times under a load of 500 g. After the sliding, linearity was determined as described below for the evaluation of high load pen input durability.

[Method for Measuring Linearity]

While a voltage of 5 V was applied to the transparent conductive multilayer body, the output voltage was measured between the terminal A (the measurement starting point) and the terminal B (the measurement endpoint) across which the voltage was applied.

Linearity may be calculated from the output voltage $E_A$ at the measurement starting point A, the output voltage $E_B$ at the measurement endpoint B, the output voltage $E_x$ at each measurement point X, and the theoretical value $E_{xx}$ according to the formulae below.

$$E_{xx}(\text{theoretical value}) = \{X \cdot (E_B - E_A)/(B-A)\} + E_A$$

$$\text{Linearity (\%)} = [(E_{xx} - E_x)/(E_B - E_A)] \times 100$$

Figure 5:
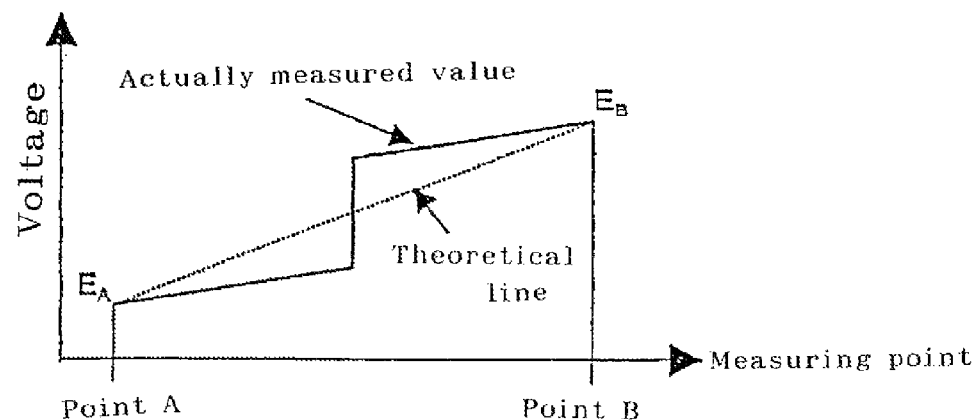
FIG. 5 is a diagram schematically showing the measurement of linearity.

FIG. 5 schematically shows the measurement of the linearity. In an image display with a touch panel, the position of the pen displayed on the screen is determined from the resistance value of the portions of the upper and lower panels brought into contact with each other by the pressing of the pen. The resistance value is determined assuming that the output voltages on the surfaces of the upper and lower panels are distributed in the form of the theoretical line (ideal line). If the actually measured voltages deviate from the theoretical line as shown in FIG. 5, the actual position of the pen cannot synchronize well with the position of the pen on the screen determined by the resistance value. The deviation from the theoretical line corresponds to the linearity, and the larger value of the linearity means the larger deviation between the actual position of the pen and the position of the pen on the screen.

(B) Sliding of a polyacetal pen (pen point R 0.8 mm) on the panel plate side formed of the transparent conductive multilayer body was performed 100,000 times under each load. The maximum load under which the linearity was at most 1.5% after the sliding was determined. The larger maximum load means the better pen input durability.

<Pen Input Bending Durability>

Figure 6:
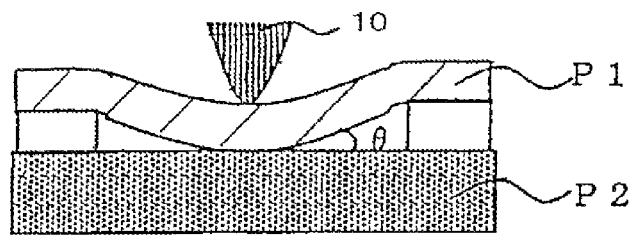
FIG. 6 is a diagram schematically showing the measurement of pen input bending durability.

(A) Sliding of a polyacetal pen (pen point R 0.8 mm) on the panel plate side formed of the transparent conductive multilayer body was performed 50,000 times under a load of 250 g. Referring to FIG. 6, in this process, the gap between the panels P1 and P2 was set at 300 μm, and the sliding of an input pen 10 on the panel plate P1 side was performed in such a manner that the pen sliding angel θ was 4.0°. After the sliding, the linearity of the transparent conductive multilayer body was measured as described above for the evaluation of pen input bending durability.

(B) Sliding of a polyacetal pen (pen point R 0.8 mm) on the panel plate side formed of the transparent conductive multilayer body was performed 100,000 times under a load of 250 g. Referring to FIG. 6, in this process, the distance between the panels P1 and P2 was controlled to modulate the angle θ. The sliding of the input pen 10 on the panel plate P1 side was performed at each angle, and the angle θ at which the linearity became at most 1.5% after the sliding was determined. The larger angel means the better pen input bending durability.

TABLE 3

| | Film Resistance (Ω/square) | Light Transmittance (%) | Hardness of Conductive Thin Film Side (Gpa) | Elastic Modulus of Conductive Thin Film Side (GPa) | Dotting Properties (Rd/Ro) | High Load Pen Input Durability | | Pen Input Bending Durability | |
|---|---|---|---|---|---|---|---|---|---|
| | | | | | | (A) Linearity (%) | (B) Load (kg) | (A) Linearity (%) | (B) Angle (°) |
| Example 1 | 280 | 89.5 | 1.5 | 6.1 | 1.0 | 0.8 | 1.0 | 10 | 3.6 |
| Example 2 | 280 | 90.0 | 1.5 | 6.1 | 1.0 | 0.8 | 1.0 | 10 | 3.6 |
| Example 3 | 280 | 90.0 | 1.7 | 8.0 | 1.0 | 0.8 | 1.5 | 10 | 3.6 |
| Example 4 | 280 | 90.0 | 2.9 | 12.4 | 1.0 | 0.8 | 3.0 | 1.0 | 4.2 |

TABLE 3-continued

|  | Film Resistance (Ω/square) | Light Transmittance (%) | Hardness of Conductive Thin Film Side (Gpa) | Elastic Modulus of Conductive Thin Film Side (GPa) | Dotting Properties (Rd/Ro) | High Load Pen Input Durability | | Pen Input Bending Durability | |
|---|---|---|---|---|---|---|---|---|---|
|  |  |  |  |  |  | (A) Linearity (%) | (B) Load (kg) | (A) Linearity (%) | (B) Angle (°) |
| Example 5 | 200 | 89.0 | 1.5 | 6.1 | 1.0 | 0.8 | 1.0 | 1.0 | 4.2 |
| Example 6 | 200 | 89.0 | 2.9 | 12.4 | 1.0 | 0.8 | 3.0 | 1.0 | 4.5 |
| Example 7 | 250 | 89.5 | 2.9 | 12.4 | 1.0 | 0.8 | 3.0 | 1.0 | 4.5 |
| Comparative Example 1 | 280 | 89.0 | 0.7 | 5.0 | 3.0 | 10 | 0.5 | 40 | 2.6 |
| Comparative Example 2 | 280 | 86.0 | 0.6 | 4.7 | 3.0 | 10 | 0.5 | 40 | 2.6 |
| Comparative Example 3 | 300 | 90.0 | 1.5 | 6.1 | 3.0 | 0.8 | 1.0 | 40 | 2.6 |
| Comparative Example 4 | 200 | 85.0 | 0.6 | 4.7 | 1.0 | 10 | 0.5 | 1.0 | 4.2 |
| Comparative Example 5 | 300 | 90.0 | 2.9 | 12.4 | 3.0 | 0.8 | 3.0 | 40 | 2.6 |

The results of Table 3 indicate that in each of Examples 1 to 7 according to the invention, the transparent conductive multilayer body has good transparency and satisfactory electrical conductivity, the conductive thin film side has good properties such as a hardness of at least 1.5 GPa and an elastic modulus of at least 6 GPa, and the touch panel therewith has not only good dotting properties and good pen input durability but also good pen input bending durability.

In Comparative Example 1, 2 or 4 without forming the first or second dielectric thin film, the transparency of the transparent conductive multilayer body was relatively low, and the touch panel had relatively low durability. In Comparative Example 3 or 5 where the content of the crystal particles with particle sizes of more than 300 nm in the conductive thin film exceeded 50% by area, the pen input bending durability was relatively low.

INDUSTRIAL APPLICABILITY

The transparent conductive multilayer body of the invention is suitable for use in liquid crystal displays, electroluminescence displays and touch panels.

The invention claimed is:

1. A transparent conductive multilayer body, comprising:
a transparent substrate, a transparent pressure-sensitive adhesive layer, a transparent film substrate, a first transparent dielectric thin film, a second transparent dielectric thin film and a transparent conductive thin film laminated in this order;
wherein the transparent conductive thin film comprises crystal particles made of an indium oxide material containing tin oxide, and
where the maximum crystal particle size corresponds to the maximum diagonal length or the maximum diameter of the crystal particles,
wherein the content of the crystal particles belonging to the maximum crystal particle size of at most 200 nm is higher than 50% by area of the crystal particles of the transparent conductive thin film, and
wherein a hardness of the transparent conductive thin film side of the transparent conductive multilayer body is 1 GPa to 5 GPa, and an elastic modulus of the conductive thin film side of the transparent conductive multilayer body is 6 GPa to 20 GPa.

2. The transparent conductive multilayer body according to claim 1, wherein the content of the crystal particles belonging to each of the maximum crystal particle size of at most 100 nm and the maximum crystal particle size of above 100 to 200 nm is at least 5% by area.

3. The transparent conductive multilayer body according to claim 1, wherein the content of the crystal particles belonging to the maximum crystal particle size of at most 100 nm is higher than 50% by area, and the remaining crystal particles fall into the maximum crystal particle size of above 100 to 200 nm.

4. The transparent conductive multilayer body according to claim 1, wherein the content of the crystal particles belonging to the maximum crystal particle size of at most 100 nm is higher than 70% by area, and the remaining crystal particles fall into the maximum crystal particle size of above 100 to 200 nm.

5. The transparent conductive multilayer body according to claim 1, wherein the content of the crystal particles belonging to the maximum crystal particle size of at most 100 nm is higher than 80% by area, and the remaining crystal particles fall into the maximum crystal particle size of above 100 to 200 nm.

6. The transparent conductive multilayer body according to claim 1, wherein the average of the maximum particle sizes of the crystal particles is from 60 to 150 nm.

7. The transparent conductive multilayer body according to claim 1, wherein the average of the maximum particle sizes of the crystal particles is from 70 to 100 nm.

8. The transparent conductive multilayer body according to claim 1, the content of the tin oxide in the total of the indium oxide and the tin oxide is from 2 to 50% by weight.

9. The transparent conductive multilayer body according to claim 8, wherein the content of the tin oxide in the total of the indium oxide and the tin oxide is from 3 to 15% by weight.

10. The transparent conductive multilayer body according to claim 1, wherein
the light refractive index $n_1$ of the film substrate, the light refractive index $n_2$ of the first dielectric thin film, the light refractive index $n_3$ of the second dielectric thin film, and the light refractive index $n_4$ of the conductive thin film satisfy the relation: $n_3 < n_2 \leq n_1 < n4$,
the first dielectric thin film has a thickness of 100 to 250 nm, and
the second dielectric thin film has a thickness of 15 to 100 nm.

11. The transparent conductive multilayer body according to claim 1, wherein the first dielectric thin film is made of an organic material or a mixture of an organic material and an inorganic material.

12. The transparent conductive multilayer body according to claim 1, wherein the second dielectric thin film is made of an inorganic material or a mixture of an organic material and an inorganic material.

13. The transparent conductive multilayer body according to claim 1, wherein the second dielectric thin film is an inorganic material formed by a vacuum deposition method.

14. The transparent conductive multilayer body according to claim 1, wherein a thickness of the transparent film substrate is 2 to 120 µm.

15. A touch panel, comprising:
- a pair of panel plates each having a conductive thin film; and
- a spacer placed between the panel plates, wherein
- the panel plates are placed opposite each other through the spacer in such a manner that the conductive thin films are placed opposite each other, and
- at least one of the panel plates comprises the transparent conductive multilayer body according to claim 1.

* * * * *